(12) United States Patent
Huang

(10) Patent No.: US 7,907,424 B2
(45) Date of Patent: Mar. 15, 2011

(54) POWER SUPPLY DEVICE HAVING ZERO SWITCHING VOLTAGE

(75) Inventor: Ming-Ho Huang, Taipei Hsien (TW)

(73) Assignee: Chicony Power Technology Co., Ltd., Taipei Hsien (TW)

( * ) Notice: Subject to any disclaimer, the term of this patent is extended or adjusted under 35 U.S.C. 154(b) by 332 days.

(21) Appl. No.: 12/198,189

(22) Filed: Aug. 26, 2008

(65) Prior Publication Data
US 2009/0179488 A1 Jul. 16, 2009

(30) Foreign Application Priority Data

Jan. 15, 2008 (TW) .............................. 97200893 U

(51) Int. Cl.
*H02M 3/335* (2006.01)
*G05F 1/445* (2006.01)
(52) U.S. Cl. ................... 363/21.03; 323/235; 363/21.04
(58) Field of Classification Search .................. 323/235; 363/21.03, 21.04, 22; 307/17
See application file for complete search history.

(56) References Cited

U.S. PATENT DOCUMENTS

| 2006/0119185 A1* | 6/2006 | Steigerwald et al. ........... 307/75 |
| 2008/0144339 A1* | 6/2008 | Hsieh et al. ................. 363/21.02 |

* cited by examiner

*Primary Examiner* — Adolf Berhane
*Assistant Examiner* — Emily Pham
(74) *Attorney, Agent, or Firm* — Muncy, Geissler, Olds & Lowe, PLLC

(57) ABSTRACT

A power supply device having zero switching voltage is disclosed to include a first switch having a parasitic body diode, a first capacitor, an inductor, a transformer, a second switch having a parasitic body diode, a second capacitor, a first voltage output unit providing a first voltage output, and a second voltage output unit having a third switch and providing a second voltage output. By means of controlling the order in which the first switch, the second switch and the third switch are to be switched on, switching voltage is eliminated from the first switch and the second switch and the working efficiency of the power supply device is raised.

9 Claims, 4 Drawing Sheets

POWER SUPPLY DEVICE HAVING ZERO SWITCHING VOLTAGE

BACKGROUND OF THE INVENTION

1. Field of the Invention

The present invention relates to power supply technology and more specifically, to a power supply device having zero switching voltage.

2. Description of the Related Art

FIG. 1 is a circuit block diagram of a conventional dual forward converter type power supply device. According to this design, the power supply device comprises a first switch 100 and a second switch 110 at its input side, and a power output unit 130 at its output side. The power output unit 130 provides a $V_{out}$ voltage output.

According to the aforesaid dual forward converter type power supply device, when the first switch 100 and the second switch 110 are switched on, a voltage drop is produced at the parasitic body diode. Therefore, it is necessary to overcome switching loss caused by such a voltage drop during a switching operation. Overcoming this switching loss results in lowering of the power supply efficiency of the dual forward converter type power supply device.

Therefore, it is desirable to provide a power supply device having zero-switching voltage that eliminates the aforesaid problem.

SUMMARY OF THE INVENTION

The present invention has been accomplished under the circumstances in view. It is one object of the present invention to provide a power supply device that eliminates switching voltage, improving the working efficiency.

To achieve this and other objects of the present invention, a power supply device in accordance with the present invention comprises a first switch, which is a three-end element and comprises a parasitic body diode and having a first end coupled to one end of a first input voltage ($V_{in}$), a second end coupled to a first control signal, and a third end; a first capacitor, which has opposing first and second ends respectively coupled to the first and third ends of the first switch; an inductor, which has one end thereof coupled to the third end of the first switch; a transformer, which comprises a primary side, a secondary side, a first winding at the primary side, and a second winding and a third winding at the secondary side; a second switch, which is a three-end element and comprises a parasitic body diode and having a first end coupled to an opposite end of the input voltage ($V_{in}$), a second end coupled to the first control signal, and a third end; a second capacitor, which has opposing first and second ends respectively coupled to the first and third ends of the second switch; a first voltage output unit providing a first voltage output; and a second voltage output unit, which comprises a third switch and provides a second voltage output. By means of controlling the order in which the first switch, the second switch and the third switch are to be switched on, switching voltage is eliminated from the first switch and the second switch.

DETAILED DESCRIPTION OF THE PREFERRED EMBODIMENT

Figure 1:
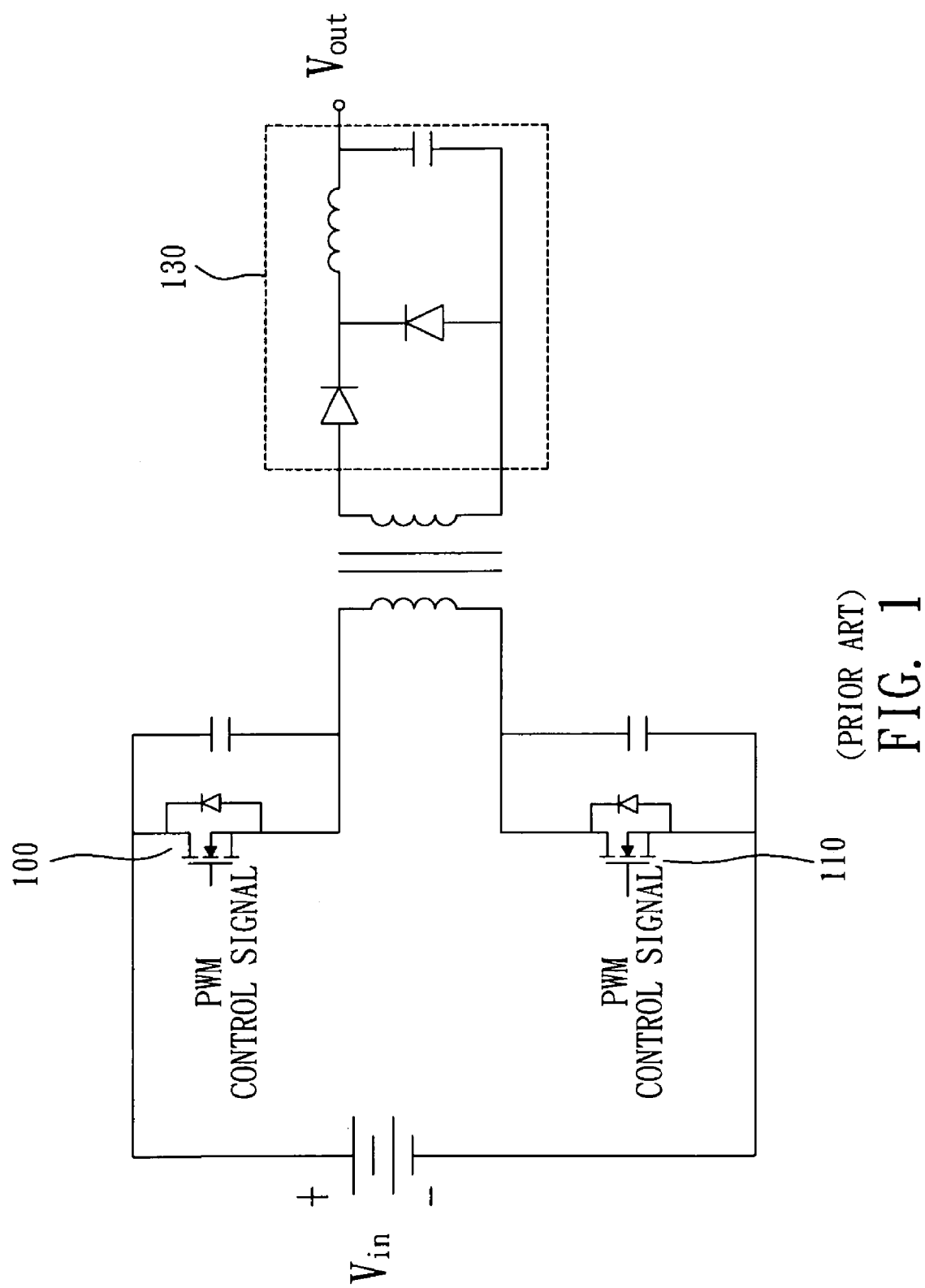
FIG. 1 is a circuit block diagram of a conventional dual forward converter type power supply device.
Figure 2:
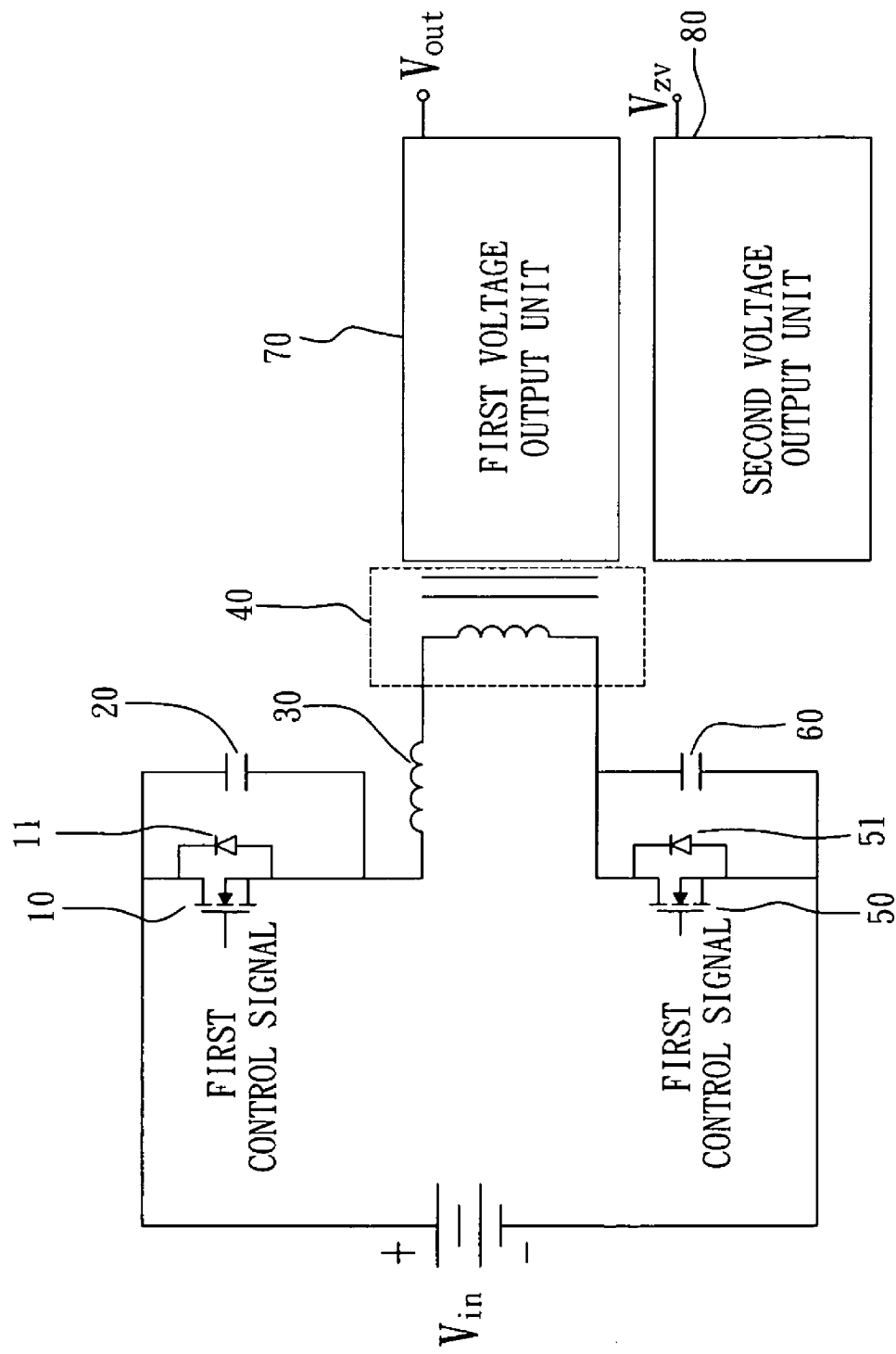
FIG. 2 is a circuit block diagram of a power supply device having zero switching voltage in accordance with the present invention.
Figure 3:
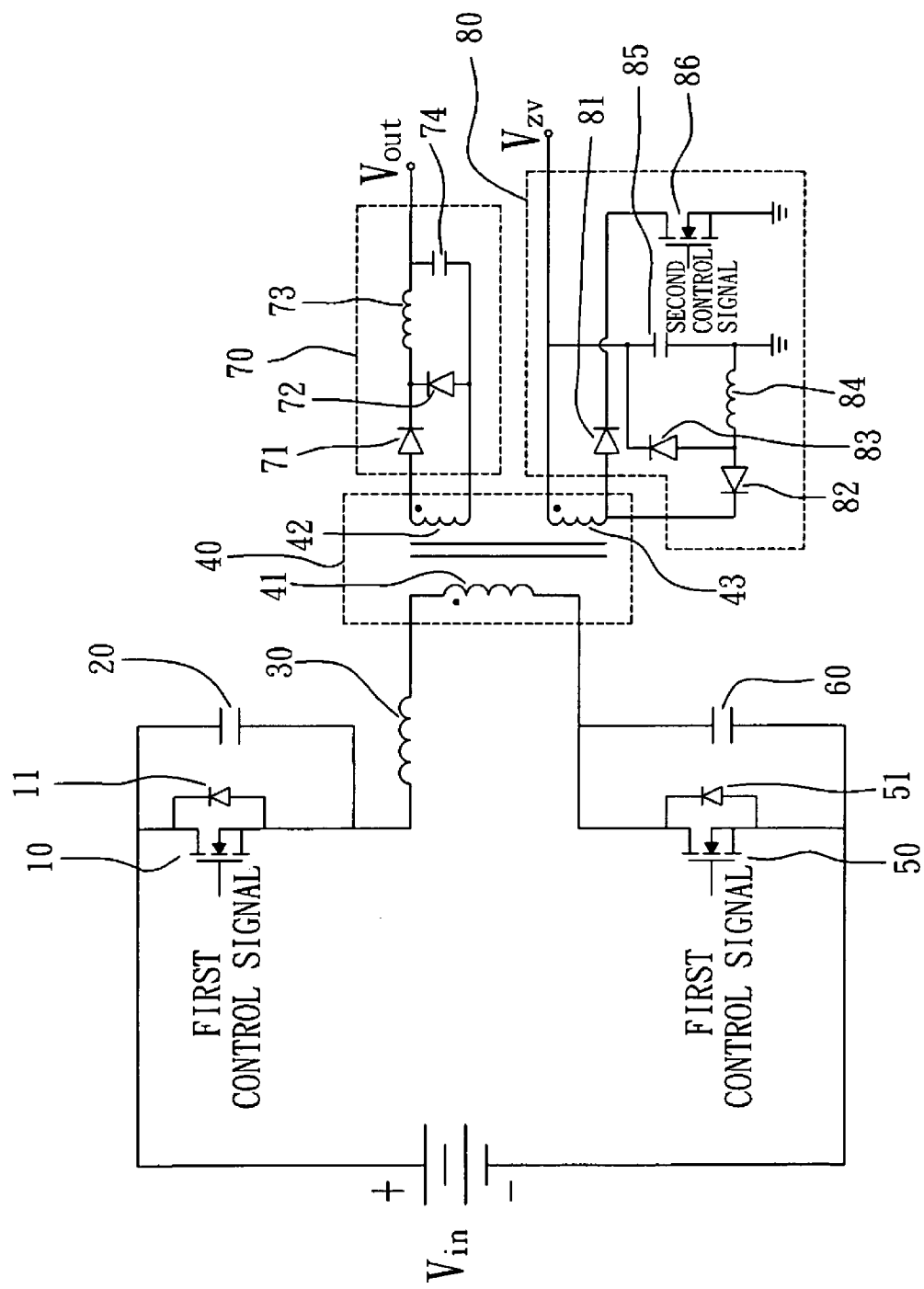
FIG. 3 is a circuit diagram of the power supply device having zero switching voltage in accordance with the present invention.
Figure 4:
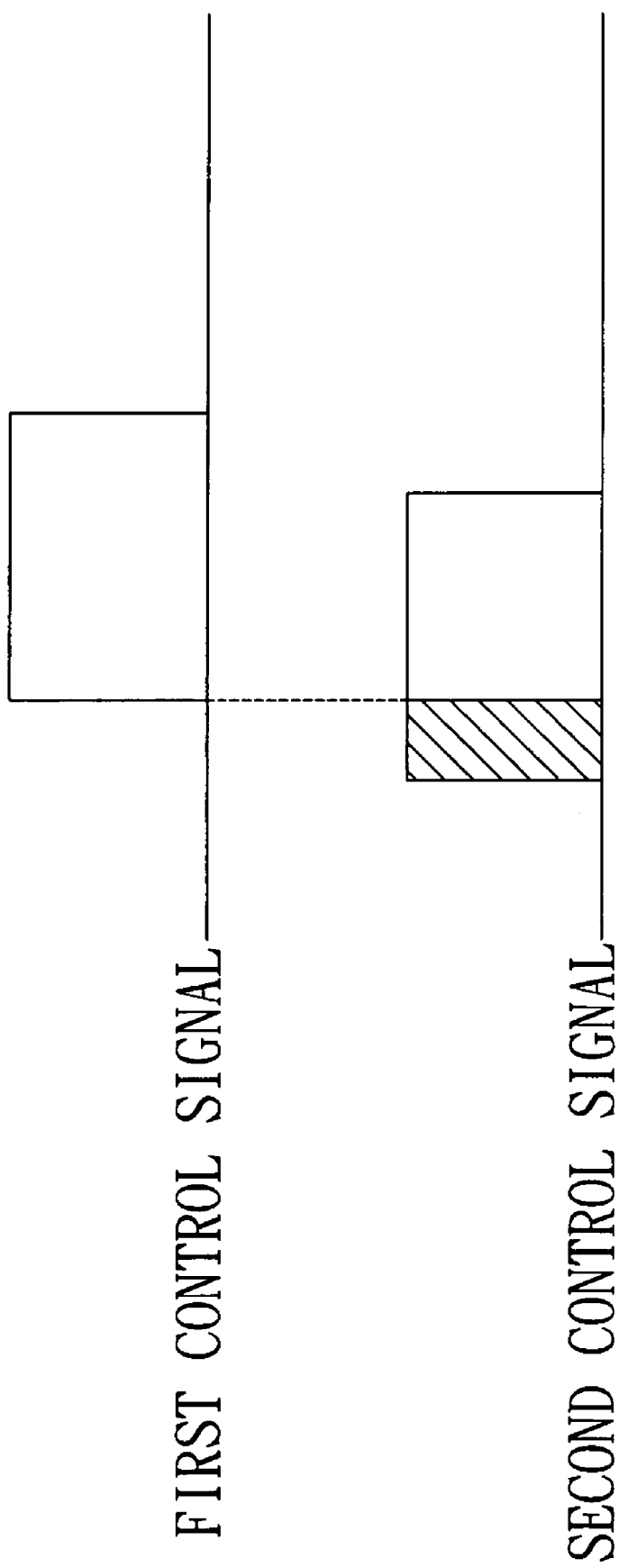
FIG. 4 is a schematic drawing of the first control signal and the second control signal according to the present invention.

Referring to FIG. 2~4 in which FIG. 2 is a circuit block diagram of a power supply device having zero switching voltage in accordance with the present invention; FIG. 3 is a circuit diagram of the power supply device having zero switching voltage in accordance with the present invention; FIG. 4 is a schematic drawing of the first control signal and the second control signal according to the present invention.

As illustrated, the power supply device having zero switching voltage comprises a first switch 10, a first capacitor 20, an inductor 30, a transformer 40, a second switch 50, a second capacitor 60, a first voltage output unit 70, and a second voltage output unit 80.

The first switch 10 is a three-end element and comprises a parasitic body diode 11. The parasitic body diode 11 has its first end coupled to one end of an input voltage $V_{in}$, and its second end coupled to a first control signal. The first switch 10 can be, but not limited to, a power switch. The power switch can be a N-pass metal oxide semiconductor field effect transistor, N-pass junction field effect transistor, P-pass metal oxide semiconductor field effect transistor, or P-pass junction field effect transistor. The first, second and third ends of the parasitic body diode 11 can be the drain, gate and source of a metal oxide semiconductor field effect transistor respectively. According to the present preferred embodiment, the first switch 10 is a N-pass junction field effect transistor.

The first capacitor 20 has two opposite ends respectively coupled to the first and third ends of the first switch 10.

The inductor 30 has its one end coupled to the third end of the first switch 10.

The transformer 40 has a primary side, a secondary side, a first winding 41 at the primary side, and a second winding 42 and a third winding 43 at the secondary side. The first winding 41 and the third winding 43 have a predetermined turn ratio so that the first capacitor 20 has a voltage $V_{in}/2$ subject to coupling through the third winding 43.

The second switch 50 is a three-end element and comprises a parasitic body diode 51. The parasitic body diode 51 has its first end coupled to the other end of the input voltage $V_{in}$, and its second end coupled to the first control signal. The second switch 50 can be, but not limited to, a power switch. The power switch can be a N-pass metal oxide semiconductor field effect transistor, N-pass junction field effect transistor, P-pass metal oxide semiconductor field effect transistor, or P-pass junction field effect transistor. Further, the first control signal can be, but not limited to, a PWM (pulse wave modulation) control signal that controls the length of conduction time of the first switch 10 and the second switch 50. Further, the first, second and third ends of the parasitic body diode 51 can be the drain, gate and source of a metal oxide semiconductor field effect transistor respectively. According to the present preferred embodiment, the second switch 50 is a N-pass junction field effect transistor.

The second capacitor 60 has two opposite ends respectively coupled to the first and third ends of the second switch 50. Subject to coupling through the third winding 43, the second capacitor 60 has a voltage $V_{in}/2$.

The first voltage output unit 70 provides a first voltage output. As shown in FIG. 3, the first voltage output unit 70 comprises a first rectifier diode 71, a second rectifier diode 72, a first coil 73, and a third capacitor 74. The first rectifier diode 71 has its one end coupled to one end of the second winding 42. The second rectifier diode 72 has its one end coupled to the other end of the second winding 42 and its other end coupled to the second end of the first rectifier diode 71. The first coil 73 can be, but not limited to, a choke coil, having its one end coupled to the other end of the first rectifier diode 71. The third capacitor 74 has its one end coupled to the other end of the first coil 73, and its other end grounded. Further, the third capacitor 74 has the first voltage output at its two opposite ends. The first voltage output unit 70 is a double forward converter that is a known circuit design and therefore, no further detailed description in this regard is necessary.

The second voltage output unit 80 comprises a third switch 86 and a second voltage output $V_{zv}$. As shown in FIG. 3, the second voltage output unit 80 further comprises a third rectifier diode 81, a fourth rectifier diode 82, a fifth rectifier diode 83, a second coil 84, a fourth capacitor 85 and a third switch 86. The third rectifier diode 81 has its first end coupled to one end of the third winding 43. The fourth rectifier diode 82 has its first end coupled to the second coil 84 and its second end coupled to one end of the third winding 43 to which the third rectifier diode 81 is coupled. The fifth rectifier diode 83 has its first end coupled to the first end of the fourth rectifier diode 82. The second coil 84 can be, but not limited to, a chock coil having its first end coupled to the first end of the fourth rectifier diode 82 and the first end of the fifth rectifier diode 83 and its second end grounded. The fourth capacitor 85 has the second voltage output $V_{zv}$ (zero voltage switching) at its two opposite ends. The third switch 86 can be a three-end element, having its first end coupled to the second end of the third rectifier diode 81, its second end coupled to the second control signal, and its third end grounded. The third switch 86 can be a power switch that can be a N-pass metal oxide semiconductor field effect transistor, N-pass junction field effect transistor, P-pass metal oxide semiconductor field effect transistor, or P-pass junction field effect transistor. The first, second and third ends of the third switch 86 can be the drain, gate and source of a metal oxide semiconductor field effect transistor. Further, the second control signal can be, but not limited to, a PWM (pulse wave modulation) control signal. Further, there is a time delay between the conduction time of the second control signal and the conduction time of the first control signal.

When the first switch 10 and the second switch 50 are switched off and the third switch 86 is switched on, the fourth capacitor 85 of the second voltage output unit 80 has the second voltage output $V_{zv}$ at its two ends to provide 300 W power supply temporarily; the second voltage output is coupled to the first winding 41 by the third winding 43 so that the first capacitor 20 and the second capacitor 60 have a voltage $V_{zv}/2$ subject to the predetermined turn ratio; $V_{in}$ at the voltage input end is added to the ends of the first capacitor 20 and the second capacitor 60 to have the first capacitor 20, the inductor 30 and the second capacitor 60 constitute a resonant loop that forces the electric current to go through the parasitic body diodes 11 and 51 and to further short circuit the passage between the source and drain of the first switch 10 and the passage between the source and drain of the second switch 50, avoiding voltage drop; when switching on the first switch 10 and the second switch 50 at this time, no switching loss will occur and therefore, improving the power conversion efficiency of the double forward converter.

By means of the application of the present invention, the power supply device having zero switching voltage eliminates switching voltage and raising the working efficiency. Therefore, the invention effectively eliminates the drawbacks of conventional dual forward converter type power supply device.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A power supply device having zero switching voltage, comprising:
   a first switch, said first switch being a three-end element and comprising a parasitic body diode, having a first end coupled to one end of a first input voltage ($V_{in}$), a second end coupled to a first control signal, and a third end;
   a first capacitor, said first capacitor having opposing first and second ends thereof respectively coupled to the first and third ends of said first switch;
   an inductor, said inductor having one end thereof coupled to the third end of said first switch;
   a transformer, said transformer comprising a primary side, a secondary side, a first winding at said primary side, and a second winding and a third winding at said secondary side;
   a second switch, said second switch being a three-end element and comprising a parasitic body diode, having a first end coupled to an opposite end of said input voltage ($V_{in}$), a second end coupled to said first control signal, and a third end;
   a second capacitor, said second capacitor having opposing first and second ends thereof respectively coupled to the first and third ends of said second switch;
   a first voltage output unit, said first voltage output unit providing a first voltage output; and
   a second voltage output unit, said second voltage output unit comprising a third switch and providing a second voltage output;
   wherein by means of controlling the order in which said first switch, said second switch and said third switch are to be switched on, switching voltage is eliminated from said first switch and said second switch;
   wherein said second voltage output unit comprises:
      a third rectifier diode, said third rectifier diode comprising a first end coupled to one end of said third winding and a second end;
      a fourth rectifier diode, said fourth rectifier diode comprising a first end, and a second end coupled to one end of said third winding;
      a fifth rectifier diode, said fifth rectifier diode comprising a first end coupled to the first end of said fourth rectifier diode and a second end;
      a second coil, said second coil comprising a first end coupled to the first end of said fourth rectifier diode and the first end of said fifth rectifier diode, and a second end grounded;
      a fourth capacitor, said fourth capacitor comprising a first end coupled to one end of said third winding and the second end of said fifth rectifier diode and a second end grounded, the first end and second end of said fourth capacitor having said second voltage output; and
      said third switch being a three-end element having a first end coupled to the second end of said third rectifier diode, a second end coupled to a second control signal and a third end grounded.

2. The power supply device having zero switching voltage as claimed in claim 1, wherein said first switch, said second switch and said third switch are power switches selected from a group of N-pass metal oxide semiconductor field effect transistor, N-pass junction field effect transistor, P-pass metal oxide semiconductor field effect transistor, and P-pass junction field effect transistor, and the first, second and third ends of each of said first switch, said second switch and said third switch are the drain, gate and source of the respective selected metal oxide semiconductor field effect transistor.

3. The power supply device having zero switching voltage as claimed in claim 1, wherein said third switch is switched on prior to said first switch and said second switch.

4. The power supply device having zero switching voltage as claimed in claim 1, wherein said first control signal is a pulse width modulation control signal.

5. The power supply device having zero switching voltage as claimed in claim 1, wherein said first winding and said third winding have a predetermined turn ratio such that one half of said input voltage $V_{in}/2$ is coupled to said first capacitor and said second capacitor.

6. The power supply device having zero switching voltage as claimed in claim 1, wherein said first voltage output unit comprises:
   a first rectifier diode, said first rectifier diode comprising a first end coupled to one end of said second winding and a second end;
   a second rectifier diode, said second rectifier diode comprising a first end coupled to an opposite end of said second winding opposite to said first rectifier diode and a second end coupled to the second end of said first rectifier diode;
   a first coil, said first coil comprising a first end coupled to the second end of said first rectifier diode and a second end; and
   a third capacitor, said third capacitor comprising a first end coupled to the second end of said first coil and a second end grounded, the first end and second end of said third capacitor having said first voltage output.

7. The power supply device having zero switching voltage as claimed claim 1, wherein said third switch is a power switch selected from a group of N-pass metal oxide semiconductor field effect transistor, N-pass junction field effect transistor, P-pass metal oxide semiconductor field effect transistor, and P-pass junction field effect transistor.

8. The power supply device having zero switching voltage as claimed in claim 1, wherein the first end, second end and third end of said third switch are the drain, gate and source of the selected metal oxide semiconductor field effect transistor.

9. The power supply device having zero switching voltage as claimed in claim 1, wherein said second control signal is a pulse width modulation control signal.

\* \* \* \* \*